May 28, 1929.  F. W. SPERR, JR  1,715,252
GAS AND LIQUID CONTACT APPARATUS
Filed Dec. 8, 1921
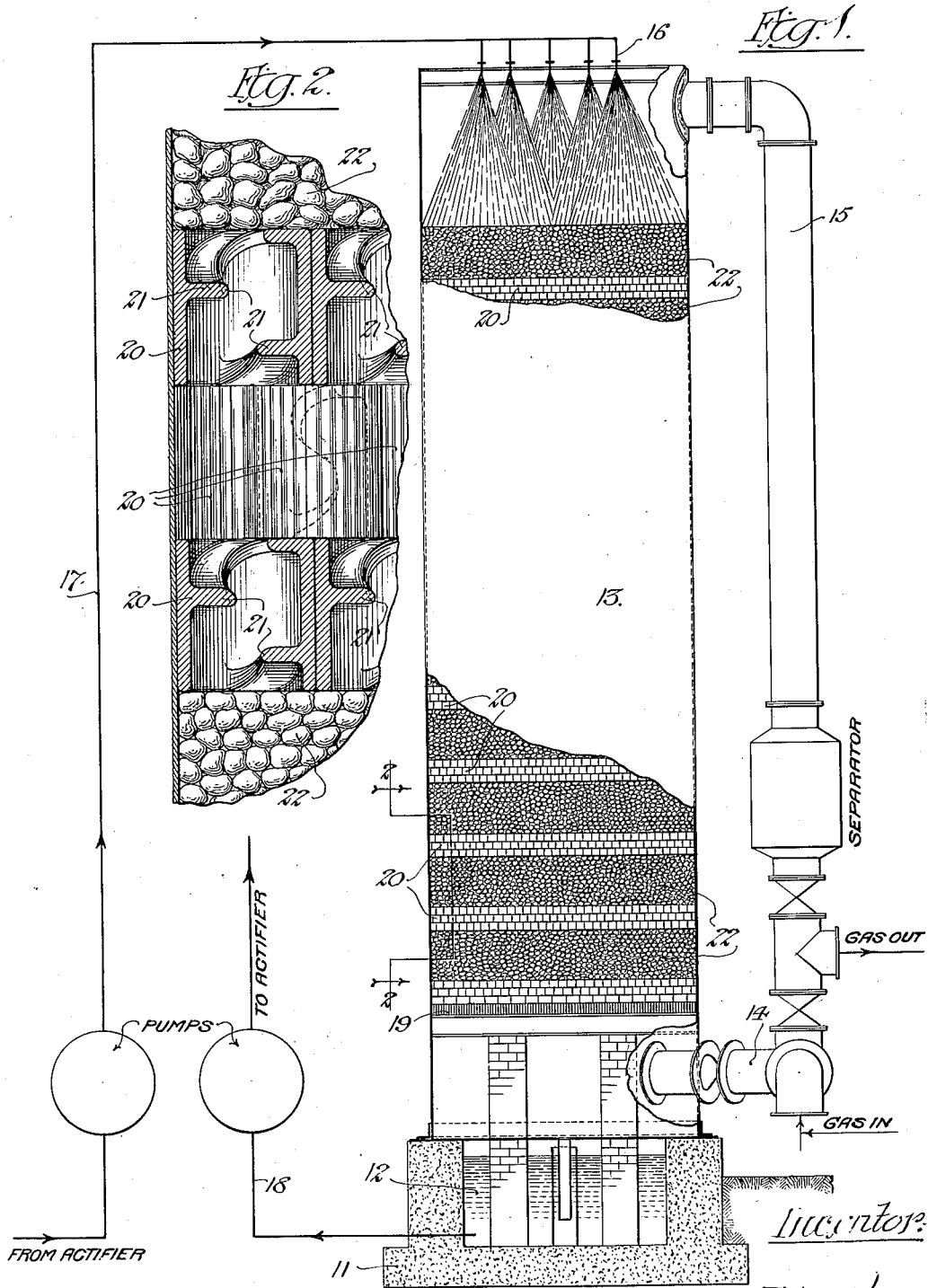

Patented May 28, 1929.

1,715,252

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS AND LIQUID CONTACT APPARATUS.

Application filed December 8, 1921. Serial No. 520,806.

This invention relates to gas and liquid contact apparatus, that is especially useful in the removal of hydrogen sulphide and other noxious constituents, such as hydrocyanic acid, from gases containing them. The invention has an important application in practicing a gas purification process operating generally in accordance with that process, described and claimed in the prior Letters-Patent of the United States of David L. Jacobson, dated September 6, 1921, No. 1,390,037. Broadly stated, such gas purification process consists in bringing the gas to be purified into direct contact with an alkaline absorbent agent, such as a solution of sodium carbonate, to absorb the noxious constituents from the gas, and then subjecting the absorbent agent containing the absorbed impurities to aeration to remove the absorbed impurities, whereby a rejuvenation of the absorbent agent is effected which renders the absorbent agent available for further gas purification. In carrying out the above stated gas purification process, there is required for the absorption stage a chamber in which the gas and absorbent agent are brought into direct contact with each other, and, in the regeneration stage in which the fouled solution is rejuvenated, there is similarly required a chamber having provision for bringing the fouled absorbent agent into direct contact with an aerating medium, such as atmospheric air. The present invention provides an efficient gas and liquid contact apparatus that is especially designed for producing the intimate contact between liquid and gas essential for carrying out either the absorption stage or the regeneration stage of the gas purification process above outlined. An important feature of the invention consists in a novel filler for the gas and liquid contact apparatus which functions not only to effect distribution of the gases and liquid throughout the apparatus but also to provide for intensive contact between such gases and liquid, and to avoid short circuiting of either the gas or liquid in restricted zones in the interior of the apparatus.

In addition to the general objects recited above, the invention has for further objects such other improvements or advantages in construction and operation as may be found to obtain in the structures and devices hereinafter described or claimed.

In the accompanying drawing, forming a part of this specification and showing, for purposes of exemplification, a preferred form and manner in which the invention may be embodied and practiced, but without limiting the claimed invention specifically to such illustrative instance:

Figure 1 is a vertical sectional elevation of a gas and liquid contact apparatus constructed in accordance with the improvements of the present invention; and Figure 2 is an enlarged sectional elevation of the interior of said apparatus, taken on the line 2—2 of Fig. 1.

The same characters of reference designate the same parts in each of the several views of the drawings.

In its present embodiment, the invention is applied to an absorber for effecting the removal of noxious constituents from gases. For convenience, the present description will be confined to this use of the invention. Features of the invention are, however, capable of other applications, for example the invention may be applied with equally satisfactory results to an apparatus for effecting regeneration of the fouled solution. Consequently, the invention is not limited in its scope to the specific use and specific embodiment herein described as an illustrative example.

Referring to the drawing and more particularly to Fig. 1, there is shown at 11 a suitable foundation provided with a well or sump 12 constituting a reservoir for liquid discharged from the bottom of the tower 13 supported on the top of the foundation 11. The tower 13 is constituted of a surrounding vertical wall and within the tower may be carried on the absorption stage, for example of a gas purification process. The gas to be purified enters the bottom of the tower through a gas inlet 14 and the purified gas passes out of the upper end of the tower through a discharge pipe 15 communicating with a separator which collects any spray that may be mechanically carried over with the gas. The liquid collected in this separator is, of course, drained into the main circulating system. The absorption solution is supplied to the upper end of the tower from a sprayer 16 connected with a solution supply line 17; and the fouled solution discharges from the bottom of the tower into the sump 12 from which the fouled solution may be pumped through a line 18 for subsequent regeneration or actification.

As the solution flows downwardly through the tower 13, it meets the ascending gas and absorbs the noxious constituents. The present invention provides means for effecting efficient distribution and an intensely intimate contact between the countercurrents of solution and gas in the tower 13. As shown the filler of the tower 13 is supported upon a horizontal grid 19 located near the bottom of the tower. The combined distributive and intensive contact functions of the invention are attained by constituting such filler of layers of distributing devices which alternate with layers of material designed to produce intensive contact between the countercurrents of gas and liquid. An efficient device for making up the several layers which effect the distributing function is the filler unit 20. Said unit comprises a hollow cylinder having a helical flange 21 projecting from the inner wall of said cylinder, the construction providing a complete helix extending from one end to the other of the cylinder, the flange, however, being of less width than the radius of the cylinder and forming a helical passage between the convolutions of the helix and yet providing a clear axial passage extending through the cylinder. In making up the alternate layers of these distributing filler units 20 each layer may be constituted of three thicknesses of such filler units assembled in such manner that they break joints with each other, as shown in Fig. 2. The bottom section 20 is built up of three thicknesses or layers of the distributing units, the lowest layer consisting of 4" x 6" spiral tile laid on bars 19 fitted across the scrubber and supported on brick or concrete piers. On top of this layer of tile a second layer is laid, but the tile of this second layer is 4" x 3". On top of this second layer is laid a third layer of such tile and the size of the tile of this layer is 3" x 3". In this manner the entire column of packing is self supporting and does not require reinforcements to the shell in which it is contained. The upper sections 20 of such tile are preferably of the smallest size 3" x 3". One reason for this is that the smaller sized tile have 29 square feet surface per cubic foot volume, while the larger sizes have less surface. Another reason is that with such smaller sized tile there is less chance for the small solid pieces of material such as crushed quartz 22 to fall down through the openings in the tile and thereby stop them up and cause short circuiting of the gas and possibly complete stoppage of flow through the chamber. It must be borne in mind that such filling material is continuously subjected to the downflowing purification liquid and also to the upflowing gas, and such material is subject to dislodgement and might fall into the tile and stop the flow therethrough and prevent such tile from functioning as they should for redistribution and diversification of both the gas and the purification liquid. By using such small sized tile with the spiral rings therein, it is possible to pile the small sized crushed material on them without danger of its running through the tile. It is better to make the first layer of quartz that is laid directly on top of the upper layer of tile of each section 20 of a coarser quartz than the rest of the quartz, in order to provide a firm base for the upper mass of such quartz. The several layers of the aforesaid filler units cause the countercurrent streams of liquid and gas to be projected in diverse directions and thus will distribute such streams of liquid and gas to the intensive contact producing filler material 22 which constitutes the intermediate layers of the filler. Such intermediate layers 22 may be made up of a packing composed of relatively small solid pieces of material such as crushed quartz, providing a great number of tortuous passageways in which intensely intimate contact is produced between the streams of gas and liquid delivered thereto in diverse directions by the filler units 20.

With a gas and liquid contact apparatus provided with a filler made up in the manner above described, the currents of gas and liquid which flow in opposite directions through the apparatus are well distributed throughout the filler, while at the same time intensive contact between the gas and liquid is attained. Short circuiting of either the gas or liquid is avoided, and great efficiency in the desired contact between the gas and the liquid is promoted.

The invention as hereinbefore set forth is embodied in a particular form of construction, but may be variously embodied within the scope of the claims hereinafter made.

I claim:

1. In an apparatus for effecting direct contact between gases and liquids, in combination: a tower having its interior substantially filled with a filler supported only at its lower end in said tower and consisting of a plurality of distributing sections each constituted of a plurality of layers of regularly arranged hollow tubes having spiral vanes therein and a plurality of intensive contact sections each of which is relatively deeper than each of the distributing sections and each of which is constituted of irregularly arranged compact fragmentary material, said distributing and said contact sections being disposed in alternation and being stacked in the tower directly one on the other and being otherwise unsupported within said tower except by the aforesaid support for the entire filler at its lower end.

2. In apparatus for effecting contact of gas and liquid, in combination: a tower having therein a filler comprising a plurality of deep contact sections, each of which is constituted of contact members arranged and spaced relatively to each other so as to present relatively upright extended contact surfaces and flow passages, and a plurality of distributing sections, each of which is of relatively lesser depth than each of the contact sections and is constituted of a plurality of layers of sloping faced members arranged with the sloping faced members of adjacent layers offset from each other in different vertical planes and closely spaced one above another so as to baffle and distribute liquid over the cross-sectional area of the tower; said contact sections and said distributing sections being disposed in alternation one above the other so that counter-flowing gas and liquid may be repeatedly distributed in said filler during passage therethrough and may also, after leaving each contact section, be uniformly spread horizontally previously to entering a next contact section.

3. In apparatus for effecting contact of gas and liquid, in combination: a tower having therein a filler comprising a plurality of contact sections, each of which is constituted of contact members arranged and spaced relatively to each other so as to present relatively upright extended contact surfaces and flow passages, and a plurality of distributing sections, each of which is constituted of a plurality of layers of sloping faced members arranged with the sloping faced members of adjacent layers offset from each other in different vertical planes and closely spaced one above another so as to baffle and distribute liquid over the cross-sectional area of the tower; said contact sections and said distributing sections being disposed in alternation one above the other so that counter-flowing gas and liquid may be repeatedly distributed in said filler during passage therethrough and may also, after leaving each contact section, be uniformly spread horizontally previously to entering a next contact section.

In testimony whereof I have hereunto set my hand.

FREDERICK W. SPERR, Jr.